US006587761B2

United States Patent
Kumar et al.

(10) Patent No.: US 6,587,761 B2
(45) Date of Patent: Jul. 1, 2003

(54) UNAMBIGUOUS INTEGER CYCLE ATTITUDE DETERMINATION METHOD

(75) Inventors: Lalit Kumar, Westlake Village, CA (US); Randal K. Douglas, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 10/000,557

(22) Filed: Oct. 23, 2001

(65) Prior Publication Data

US 2003/0078705 A1 Apr. 24, 2003

(51) Int. Cl.[7] .............................. G05D 1/00; G06F 7/00
(52) U.S. Cl. .................... 701/13; 701/3; 701/4
(58) Field of Search ................. 701/3, 4, 13, 213, 701/214, 215; 342/357.04, 357.06, 357.08

(56) References Cited

U.S. PATENT DOCUMENTS 4,894,662 A * 1/1990 Counselman .......... 342/357.12

* cited by examiner

*Primary Examiner*—Yonel Beaulieu
(74) *Attorney, Agent, or Firm*—Derrick Michael Reid

(57) ABSTRACT

A vehicular position and attitude can be accurately determined from GPS signals by positioning a master and two slave orthogonally disposed receiver antennas rigidly mounted together enabling the rotation of the slave receiver antennas about the master antenna. The slave antennas are rotated and then dither back and forth so that differential phase measurements between the slave antennas and the master antenna is nulled in carrier phase alignment of the GPS signals for determining azimuth angles and elevation angles to the GPS satellites for determining the position and attitude of the vehicle.

10 Claims, 3 Drawing Sheets

SATELLITE COORDINATE SYSTEM

SATELLITE COORDINATE SYSTEM

EQUIPHASE GEOMETRY

ATTITUDE DETERMINATION SYSTEM

UNAMBIGUOUS INTEGER CYCLE ATTITUDE DETERMINATION METHOD

FIELD OF THE INVENTION

The invention relates to the field of attitude reference determination of moving vehicles. More particularly, the present invention relates to attitude reference determination of spacecraft providing carrier integer cycle ambiguity resolution.

BACKGROUND OF THE INVENTION

Aircraft and spacecraft vehicles require methods and apparatus for accurately determining respective positions during flight missions. Position determination has been improved using the Global Position System (GPS) that includes a constellation of orbiting GPS satellites broadcasting ephemeral signals to receivers. The receivers may be fixed at a ground base or carried onboard a moving ground, airborne or space vehicle. Position determinations resulting in determined points in space as well as an attitude reference using GPS is well known in the art. During GPS position determination applications, a range distance between a receiver and a GPS satellite is determined by measuring the time it takes for the pseudo random signal to travel the distance from the GPS satellite to the receiver. Knowing four range measurements from four respective different GPS satellites to the receiver, the receiver position can be uniquely determined by well known spatial reference frame computational processes. The receiver position is the location of the receiver in three dimensional X, Y, Z space. The attitude of a vehicle is an angular orientation that requires the position of at least three receiver antennas to achieve centimeter level accuracy. However, the accuracy of these range measurements is of the order of several meters and therefore the range measurements are not precise enough for determining the attitude of the vehicle as an angular orientation reference. Another measurable quantity of the GPS signal is the carrier phase that is a fractional part of a carrier cycle. The carrier phase needs to be precisely determined for improved accuracy of the position determination. Before the fractional carrier phase measurements at the antennas can be converted into receiver to satellite ranges, knowledge of the integer cycles spanning these ranges is required. The integer cycles can be ambiguously determined due to a lack of precise range determinations. A number of approaches currently exist to resolve this integer cycle ambiguity. However, the current methods suffer various computational problems limiting the ability to effectively determine the carrier cycles. Earlier software based approaches utilize an integer search method attempting to minimize a cost function. The software based approaches check different sets of integer values that can number in millions for antennas separated by just a few meters. The problems that arise with this software based approach include the existence of nonunique solutions that create the possibility of converging to a wrong set of integers. Also, due to existence of a very large set of integer combinations, processing takes large amount of time to check all of the integer possibilities. This limits the reaction time of an agile vehicle. Further, most search algorithms may not always converge to a solution. Another current approach utilizes integer resolution algorithms that use additional information due to motion of the vehicle to determine the integer cycle of the carrier. These integer resolution algorithms possess the same inherent computational problems that are not significantly reduced. These and other disadvantages are solved or reduced using the invention.

SUMMARY OF THE INVENTION

An object of the invention is to provide a method for attitude reference determination.

Another object of the invention is to provide a method for determining elevation angles and azimuth angles to pseudo stars. Another object of the invention is to provide a method for determining elevation angles and azimuth angles to pseudo stars for attitude reference determination.

Yet another object of the invention is to provide a method for determining elevation and azimuth angles to GPS satellites by rotating receiver antennas about a reference axis and dithering the antennas along an orthogonal axes for carrier phase alignment of the received GPS signals.

Still another object of the invention is to provide a method for positioning receiver antennas in carrier phase alignment of GPS signals by rotation about a reference axis and dithering the receiver antennas along orthogonal axes for determining a position and attitude in inertial space.

A further object of the invention is to provide a method for positioning receiver antennas by rotation about an attitude axis and dithering along orthogonal axes for receiving GPS signals in carrier phase alignment when the antennas are orthogonally positioned for determining the attitude axis.

The invention is a method directed to positioning receiver antennas in carrier phase alignment of GPS signals for determining coelevation and azimuth angles to GPS satellites. The coelevation and azimuth angles can be used for determining the attitude of the vehicle in an inertial reference frame from known GPS satellite lines of sight. The method can be preferably used for determining the attitude of a airborne or spaceborne craft receiving GPS signals from GPS satellites functioning as pseudo star references. The method is practiced using a GPS receiver system and signal processing algorithms that determine the attitude of an arbitrary ground receiver, aircraft or spacecraft. In the preferred form, the system uses a master antenna and two dependent slave antennas, each of which having a respective receiver for receiving the GPS signals. The antennas are orthogonally aligned respecting each other and are controlled to undergo prescribed motions relative to each other. A fractional phase of the GPS carrier signal received at each of two dependent slave antennas is measured relative to the master antenna. Processing of the measured carrier signal is used to eliminate the integer cycle ambiguity for determining the attitude reference by computing two noncolinear lines of sight vectors. The method comprises of means to determine more than one noncolinear unit vector along the lines of sight from the master antenna to GPS satellites functioning as pseudo stars.

The method includes signal processing steps to compute the unit vectors in two coordinate systems. The two coordinate systems are an earth centered inertial coordinate system and a local coordinate frame system attached to the craft. The signal processing steps are provided to compute the attitude from the direction cosine matrix between the local coordinate system and the earth centered inertial coordinate system. The system preferably includes the set of three antennas mounted on a rigid frame forming essentially two orthogonal directions. A first orthogonal direction extends from the first master antenna to the second x axis slave antenna along an x axis. A second orthogonal direction extends from the master antenna to a third y axis antenna along a y axis. The system provides motors for rotating the rigid frame about a vertical z axis extending through the master antenna. Each of the second and third slave antennas are controlled to undergo back-and-forth dither motion along respective orthogonal lines respectively extending from the master antenna to the second and third antennas. A controller rotates the frame about the z axis for positioning the rigid frame while controlling the two slave antennas to respectively undergo the dither motion along the x axis and y axis. A system includes a microprocessor that continuously measures the differential carrier phase between the master antenna and the x axis antenna and between the master antenna and y axis antenna. Signal processing steps of the differential phase data enables determination of the unit vectors along the line of sights from the master antenna and various GPS satellites. The lines of sight data is used for accurately determining the attitude reference of the vehicle. The position and attitude can be determined without resolving carrier phase ambiguity. These and other advantages will become more apparent from the following detailed description of the preferred embodiment.

DETAILED DESCRIPTION OF THE PREFERRED EMBODIMENT

Figure 1:
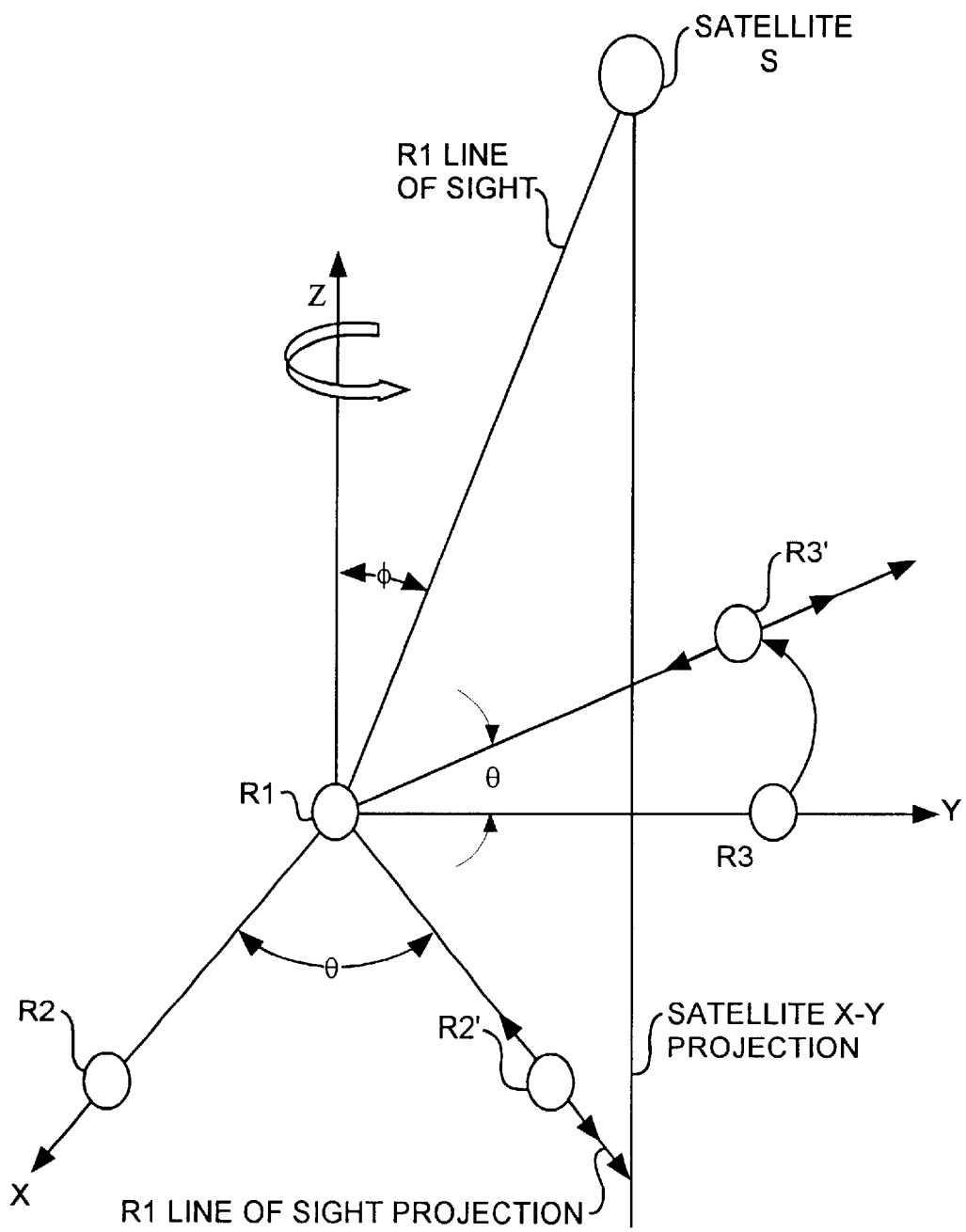
FIG. 1 depicts a satellite coordinate system.

An embodiment of the invention is described with reference to the figures using reference designations as shown in the figures. Referring to FIG. 1, three GPS receiver antennas R1, RA, and R3 are mounted on the vehicle, not shown, having a position and attitude in inertial space. The receiver antenna R1 is a first master antenna on a vehicle that has a relative attitude and a position in inertial space. The R2 receiver antenna is a second slave antenna. The receiver antenna R3 is a third slave antenna. The attitude of the vehicle is defined with respect to a local orthogonal coordinate frame with the origin point at R1. A line extending between receivers R1 and R2 defines a local x axis. A line extending between receivers R1 and R3 defines a local y axis. A z axis extends through the master receiver R1 and is defined by the right-hand rule of the cross-product between the x axis and y axis. The x axis, y axis and z axis form a reference frame for attitude determination. A curved arrow around the z axis indicates that the antennas can be rotated about the z axis through the full 360 degrees providing a capability to position R2 and R3 slave antennas at any desired angular position in the local x-y plane. An R1 line of sight is the vector from master antenna R1 to a GPS satellite S.

The angle $\theta$ is an azimuth angle and the angle $\phi$ is a coelevation angle of the line of sight to the GPS satellite S functioning as a pseudo star. The azimuth angle and coelevation angle define the R1 line of sight relative to the x, y and z local axes which are relative to a vehicle, not shown, having a position and attitude in inertial space. The positions R2' and R3' show the new locations of antennas R2 and R3 after being rotated through the azimuth angle $\theta$. The double-headed arrows through R2' and R3' indicate that the R2 and R3 antennas can be controlled to undergo linear dither motion relative to the master antenna R1 at the origin point.

Figure 2:
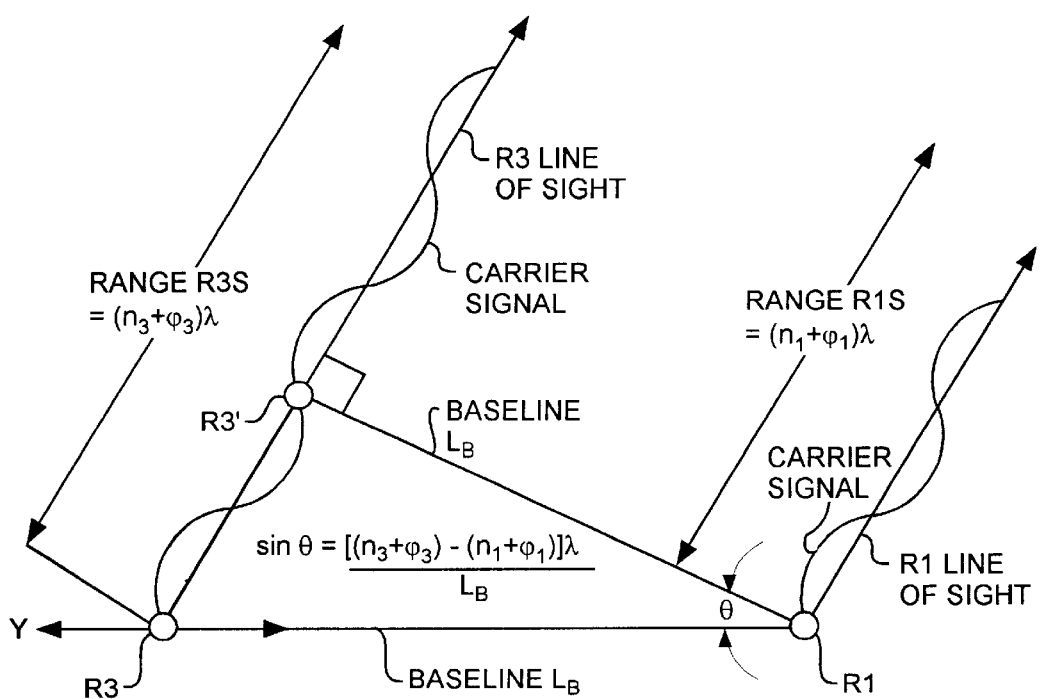
FIG. 2 depicts equiphase geometry of receiver antenna locations.

Referring to FIGS. 1 and 2, the equiphase geometry of the antennas R1 and R3 is obtained after the antennas have been rotated through an angle $\theta$ about the z axis. In this configuration, the antenna R2 occupies the new location R2' and the antenna R3 occupies the new location R3'. Before undergoing the rotation $\theta$, the path length between R1 and the satellite S can be represented in terms of an integer number of cycles $n_1$ plus a fractional phase $\phi_1$, that is, as $(n_1+\phi_1)\lambda$, where $\lambda$ is the wavelength of a GPS carrier signal. Similarly, before the rotation through the angle $\theta$, the path length R3 and the satellite S is $(n_3+\phi_3)\lambda$. After rotation through the angle $\theta$, the antennas R2 and R3 are positioned at the new R2' and R3' positions, respectively. At the R3' location, path lengths R1 to S and R3' to S are exactly the same, that is, $n_1=n_3$ and $\phi_1=\phi_3$ at which location, there is a 90° degree angle between a baseline $L_B$ and both the path lengths R1 to S and R3' to S. This property of equal path lengths is utilized to determine the azimuth angle $\theta$, by forcing the measurement of the fractional phase difference $(\phi_1-\phi_3)$ at R1 and R3 to go to zero in carrier phase alignment. The receiver antenna R2 is dithered linearly as the fractional phase $\phi_2$ is measured continuously. The coelevation angle $\phi$ is determined from changes in the fractional phase $\phi_2$ as the receiver antenna R2 travels from a point nearest to the receiver antenna R1 to a point farthest from R1.

Figure 3:
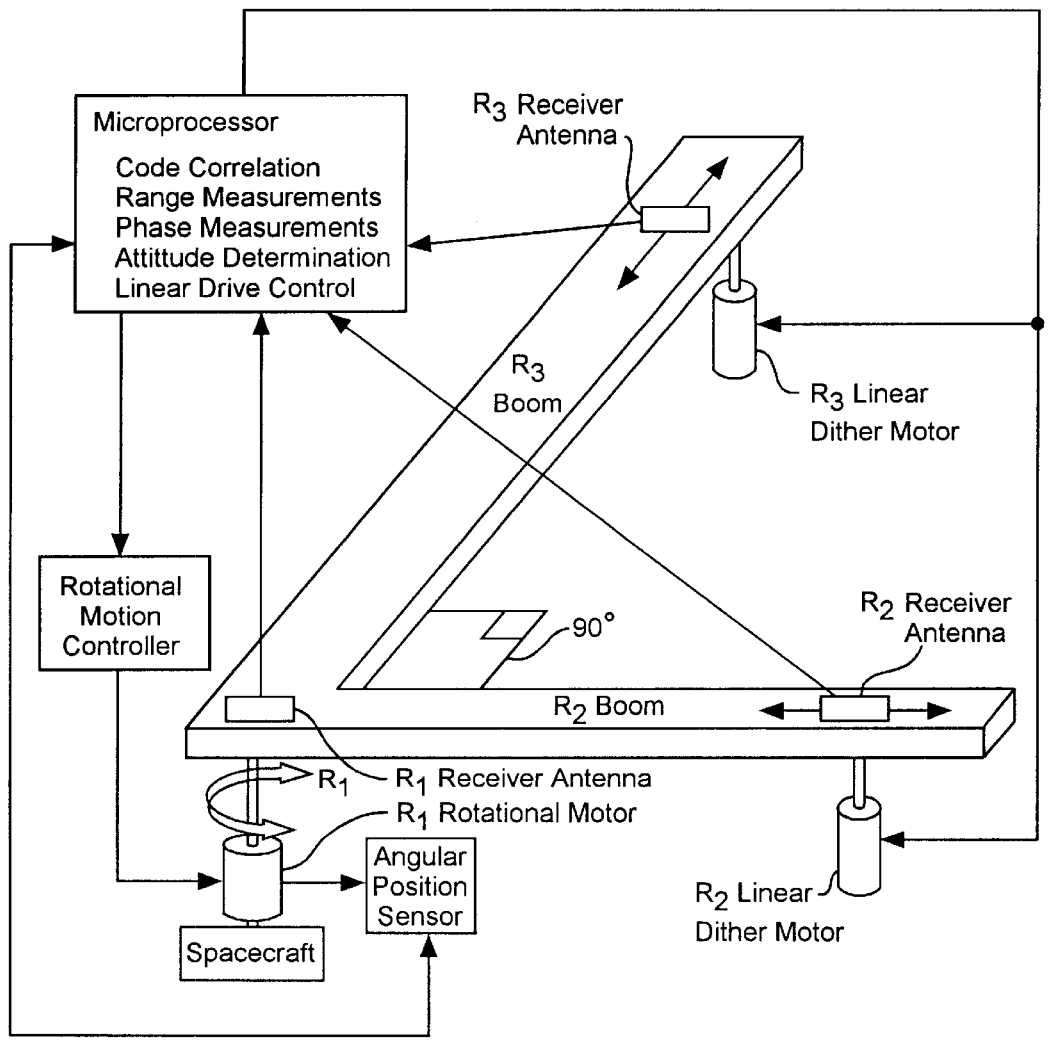
FIG. 3 depicts generic hardware for the preferred embodiment.

Referring to all of the Figures, and particularly to FIG. 3, receiver antennas R2 and R3 are disposed on the R2 boom and the R3 boom, respectively, forming an orthogonal structure that is mounted to a vehicle having an attitude of a spacecraft that is to be determined. The R1 motor is secured to the vehicle and an angular position sensor can sense the relative angle of the R2 and R3 booms relative to the attitude of the vehicle. An R1 rotational drive motor is used to rotate the booms so as to rotate the slave receiver antennas R2 and R3 about master receiver antenna R1. A microprocessor can provide for controlling a rotational motion controller that controls the R1 rotational motor. The microprocessor can be further programmed to execute code correlation, range measurements, carrier phase measurements and attitude determinations. The R1 rotation motor is connected to the R1 boom and the R2 boom using a shaft assembly providing a full 360 degrees of rotational freedom about the local z axis. The R1 receiver has an antenna mounted at the junction of R2 boom and the R3 boom, forming the origin of the local x axis, y axis and z axis local coordinate system. The R2 and R3 receiver antennas are respectively mounted on R2 and R3 booms and at a nominal distance of $L_B$ from the R1 receiver antenna. The R2 receiver antenna is connected to an R2 linear dither motor that provides the capability of linearly moving the R2 receiver along the R2 boom relative to the R1 receiver. Similarly, the R3 receiver antenna is mounted on the R3 boom and is connected to an R3 linear dither motor also providing linear motion relative to the R1 receiver antenna. The R1 rotational drive motor and the R2 and R3 linear dither motors have angular position sensors that feed into the microprocessor. The microprocessor controls the position of the booms through the rotational motion controller. The microprocessor processes signals to perform GPS code correlation, range measurements, carrier phase measurements and attitude determination.

The microprocessor is used for determining the attitude of a vehicle, including roll, pitch and yaw angles with respect to a inertial frame of reference. The attitude of a vehicle can be determined when at least two noncolinear vectors, from the vehicle to known points in space, are available. For example, a unit vector, which lies along the R1-S line of sight (LOS) between antenna R1 and the satellite S, can be defined by its components $[l_1 l_2 l_3]$ in an inertial coordinate system $X_I$, $Y_I$, $Z_I$. The same unit vector, along the R1-S line of sight, can also be represented by [$\sin \phi \cos \theta$, $\sin \phi \sin \theta$, cos φ] in the local X, Y, Z coordinate system. By definition, a vector in the local x, y, z coordinate system can be transformed to the inertial $x_I$, $y_I$, $z_I$ coordinate system using a direction cosine matrix denoted by $C_B^I$.

$$\begin{bmatrix} \sin\phi\cos\theta \\ \sin\phi\cos\theta \\ \cos\phi \end{bmatrix} = [C_B^I] \begin{bmatrix} l_1 \\ l_2 \\ l_3 \end{bmatrix}$$

When angles θ and φ are known for two independent noncolinear lines of sight vectors from antenna R1 to GPS satellites, then the attitude matrix $C_B^I$ can be determined. The system provides the means to compute azimuth angle θ and the coelevation angle φ from the fractional phase measurements made at the multiple antennas without the need to know integer number of cycles. When a receiver R1 is located at the origin and R2, R3 at a known distance $L_B$ from R1 along the local x, y axes, ranges R1-S and R3-S can be represented as R1-S=$(n_1+\phi_1)\lambda$, where $n_1$ equals the integer cycles of the carrier signal and $\phi_1$ equals the fractional phase that is measured. Similarly R3-S=$(n_3+\phi_3)\lambda$. The desired azimuth angle θ can be expressed by an azimuth angle equation.

$$\sin\theta = \frac{[(n_3 - n_1) + (\varphi_3 - \varphi_1)]\lambda}{L_B}$$

In the azimuth angle equation, integer cycles are not observable from the fractional phase measurements and constitute a fundamental limitation in fully utilizing the high-resolution phase data for attitude determination. To illustrate this point, phase of a periodic signal can readily be determined with one percent accuracy. Therefore, measuring the $L_1$ phase of a GPS L1 carrier signal at 1575.42 MHz can provide a spatial resolution of roughly 0.19 cm, which for a baseline of 1 meter translates into an attitude resolution of 0.10 degrees. However, this level of accuracy is possible only if integer cycles $n_1$ and $n_3$ in the azimuth angle equation are known. Hence, the integer number of cycles are eliminated and thereby provide a means to determine attitude with fractional phase measurements.

The set of three GPS receivers R1, R2, R3 are mounted in a plane defined by the R1–R2 line and the R1–R3 line, respectively, for forming the x and y axes of the local coordinate system. The z axis is through the origin defined by the right-hand rule of x into y. The line-of-sight from the R1 origin to a GPS satellite S is defined by spherical coordinates φ and θ. Means are provided to be able to rotate the antenna assembly about the z axis. It is seen that after a positive rotation of θ about the z axis, the difference in path lengths R1-S and R2-S would be a maximum and at the same time, receiver antennas R1 and R3 would be equidistant from the satellite, with a path length difference equal to zero. However, when a mechanized control system simultaneously nulls the phase difference between one of the pairs and maximizes on the other, the angle θ would still not be determined uniquely due to integer cycle ambiguity. The fractional phase difference between a pair of receiver antennas would be zero as long as the path length difference is an integer multiple of a wavelength. This means that, depending upon the length of the baseline $L_B$ between the receivers, and the coelevation φ, there could be multiple values of θ in the 0° to 360° range for which the phase difference would be zero. To solve this problem, the relative linear dither motion between the pairs R1–R2 and R1–R3 is used. When the null phase difference is maintained between a pair of receiver antennas while the receivers are in relative linear motion along a line joining them, then both the receiver antennas must be equidistant from the satellite, and the angle θ is determined uniquely from a z axis angular position sensor reading for an angle relative to the vehicle. The coelevation angle φ can be solved by computation based on relative phase measurements. The rotational capability about the z axis is provided. After angle θ has been determined, the fractional phase $\phi_2$ at antenna R2 undergoing relative linear motion is measured. The coelevation angle φ can then be computed using the coelevation equation.

$$\cos\phi = \frac{[(n_2 + \varphi_{2i}) - (n_2 + k + \varphi_{2f})]\lambda}{L_{dither}} = \frac{[\varphi_{2i} - (k + \varphi_{2f})]\lambda}{L_{dither}}$$

In the coelevation equation, k is the number of integer cycles elapsed as the antenna R2 travels between the two extremes of the dither cycle that is continuously tracked between the measurements. And $\phi_{2i}$ and $\phi_{2f}$ are the fractional phases measured at the two extremes of the dither motion, and dither is the dither amplitude. This process of determining azimuth angle θ and coelevation angle φ is repeated with a second satellite to obtain the two noncolinear line of sight vectors. Further processing of this data provides the attitude of the vehicle.

The system could also include linear dither position sensors for measuring the dither length of the R2 and R3 receiver antennas. In the alternative method, the antenna structure could be attached to a vehicle through a gimbal system that provides the antenna structure with a three axis rotational freedom relative to the vehicle. After angle θ has been determined, antenna structure is rotated about the R1–R3' axis until null phase difference is obtained between R1–R2'. The elevation angle φ is read directly from the angular position sensor along R1–R3' axis. Also, a pseudo star can be any transmitter having a predetermined inertial position transmitting a signal modulating a carrier. Those skilled in the art can make enhancements, improvements, and modifications to the invention, and these enhancements, improvements, and modifications may nonetheless fall within the spirit and scope of the following claims.

What is claimed is:

1. A method of positioning an R3 point relative to an R1 point for receiving in carrier phase alignment a carrier phase of a carrier signal transmitted by a first pseudo star, the method comprising the steps of, third receiving the carrier signal at the R1 point and the R3 point, the point R1 lying on a z local axis, the point R3 lying on a y local axis, the y local axis extending between the R1 point and the R3 point, the y local axis being orthogonal to the z local axis, the R1 point lying on a first line of sight extending between the R1 point and the first pseudo star, third dithering the R3 point a first dithering length along the y local axis, third phase measuring a first phase difference of the carrier phase between the R1 point and the R3 point, the first phase difference is zero and remains zero as the R3 point dithers along the first dithering length when in carrier phase alignment, and rotating the R3 point about the z local axis extending through the R1 point until carrier phase alignment during the third dithering step.

2. The method of claim 1 further comprising the step of, azimuth determining an azimuth angle, the rotation of the R3 point during the rotating step defines a rotation angle relative to a reference line orthogonally extending from the z local axis when the R1 point and R3 point are in carrier phase alignment during the third dithering step, the azimuth angle and z local axis define a first plane through which extends the first line of sight.

3. The method of claim 1 further comprising the step of, azimuth determining an azimuth angle, the rotation of the R3 point during the rotating step defines a rotation angle relative to a y local axis orthogonally extending from the z local axis when the R1 point and R3 point are in carrier phase alignment during the third dithering step, the azimuth angle and z local axis define a first plane through which extends the first line of sight.

4. The method of claim 1 further comprising the steps of, second receiving at an R2 point the carrier signal, the point R2 lying on an x local axis, the x local axis extending from the R1 point to the R2 point, the x local axis being orthogonal to the z local axis and being orthogonal the y local axis, second phase measuring a second phase difference and a third phase difference of the carrier phase received at the R2 point and at the R1 point, and coelevation determining a coelevation angle of the first line of sight from the second phase difference and the third phase difference.

5. The method of claim 1 further comprising the steps of, second receiving at an R2 point the carrier signal, the point R2 lying on an x local axis, the x local axis extending from the R1 point to the R2 point, the x local axis being orthogonal to the z local axis and being orthogonal to the y local axis, second dithering the R2 point a second dither length along the x local axis, second phase measuring a second phase difference and a third phase between the carrier phase at the R1 point and the R2 point as the R2 point moves along the x local axis at two respective points in the dithering length during the second dithering step, and coelevation determining a coelevation angle from the second phase difference and the third phase difference, the coelevation angle of the first line of sight extending through a first plane.

6. The method of claim 1 further comprising the steps of, azimuth determining an azimuth angle, the rotation of the R3 point during the rotating step defines a rotation angle relative to a reference line orthogonally extending from the z local axis when the R1 point and R3 point are in carrier phase alignment during the third dithering step, the azimuth angle and z local axis define a first plane through which extends the first line of sight, second receiving at an R2 point the carrier signal, the point R2 lying on a x local axis, the x local axis extending from the R1 point to the R2 point, the x local axis being orthogonal to the z local axis and being orthogonal to the y local axis, second dithering the R2 point a second dither length along the x local axis, second phase measuring a second phase difference and a third phase difference between the carrier phase at the R1 point and the R2 point as the R2 point moves along the x local axis during the second dithering step, and coelevation determining a coelevation angle from the second phase difference and the third phase difference, the coelevation angle defining the first line of sight extending through the first plane.

7. The method of claim 1 further comprising the steps of, azimuth determining an azimuth angle, the rotation of the R3 point during the rotating step defines a rotation angle relative to a reference line orthogonally extending about the z local axis when the R1 point and R3 point are in carrier phase alignment during the third dithering step, the azimuth angle and z local axis define a first plane through which extends the first line of sight, second receiving at an R2 point the carrier signal, the point R2 lying on an x local axis, the x local axis extending from the R1 point to the R2 point, the x local axis being orthogonal to the z local axis and being orthogonal to the y local axis, second dithering the R2 point a second dither length along the x local axis, second phase measuring a second phase difference and a third phase difference between the carrier phase at the R1 point and the R2 point as the R2 point moves along the x local axis during the second dithering step, coelevation determining a coelevation angle from the second phase difference and the third phase difference, the coelevation angle defining the first line of sight extending through the first plane, first line of sight determining from the azimuth angle and the coelevation angle relative to the z local axis, repeating all the steps a second time for determining a second line of sight angle to a second pseudo star, and determining an orientation of the z local axis and the x local axis and the y local axis from the first and second lines of sight.

8. The method of claim 7 wherein, the orientation is an attitude of a space vehicle with respect to an inertial reference frame, the first and second pseudo stars are GPS satellites, and the z local axis and x local axis and the y local axis define a local coordinate frame of the space vehicle.

9. The method of claim 7 wherein, the x local axis and the y local axis and the z local axis respectively are a yaw axis and a pitch axis and a roll axis of a vehicle.

10. A method of determining the attitude of a space vehicle receiving in carrier phase alignment a carrier phase of a carrier signal transmitted by a first GPS satellite and a second GPS satellite, the method comprising the steps of, third receiving the carrier signal at an R1 point and an R3 point, the point R1 lying on a z local axis, the point R3 lying on a y local axis, the y local axis extending between the R1 point and the R3 point, the y local axis being orthogonal to the z local axis, the R1 point lying on a first line of sight extending between the R1 point and the first GPS satellite, third dithering the R3 point a first dithering length along the x local axis, third phase measuring a first phase difference of the carrier phase between the R1 point and the R3 point, the first phase difference is zero and remains zero as the R3 point dithers along the first dithering length when in carrier phase alignment, and rotating the R3 point about the z local axis extending through the R1 point until carrier phase alignment during the third dithering step, azimuth determining an azimuth angle, the rotation of the R3 point during the rotating step defines a rotation angle relative to the vehicle, the rotation angle orthogonally extending about the z local axis when the R1 point and R3 point are in carrier phase alignment during the third dithering step, the azimuth angle determined from rotational angle, the azimuth angle and z local axis define a first plane through which extends the first line of sight, second receiving at an R2 point the carrier signal, the point R2 lying on an x local axis, the x local axis extending from the R1 point to the R2 point, the x local axis being orthogonal to the z local axis and being orthogonal to the y local axis, second phase measuring a second phase difference and a third phase difference between the carrier phase at the R1 point and the R2 point as the R2 point moves along the y local axis, coelevation determining a coelevation angle from the second phase difference and the third phase difference, the coelevation angle defining the first line of sight extending through the first plane, first line of sight determining from the azimuth angle and coelevation angle relative to the z local axis, repeating all the steps a second time for determining a second line of sight angle to the second GPS satellite, and determining the attitude of the space vehicle with respect to an inertial reference frame, the attitude being an orientation of a local reference frame defined by the z local axis and the y local axis and the x local axis.

* * * * *